(No Model.)
J. KITTLE.
FERTILIZER DISTRIBUTER.
No. 330,333. Patented Nov. 10, 1885.
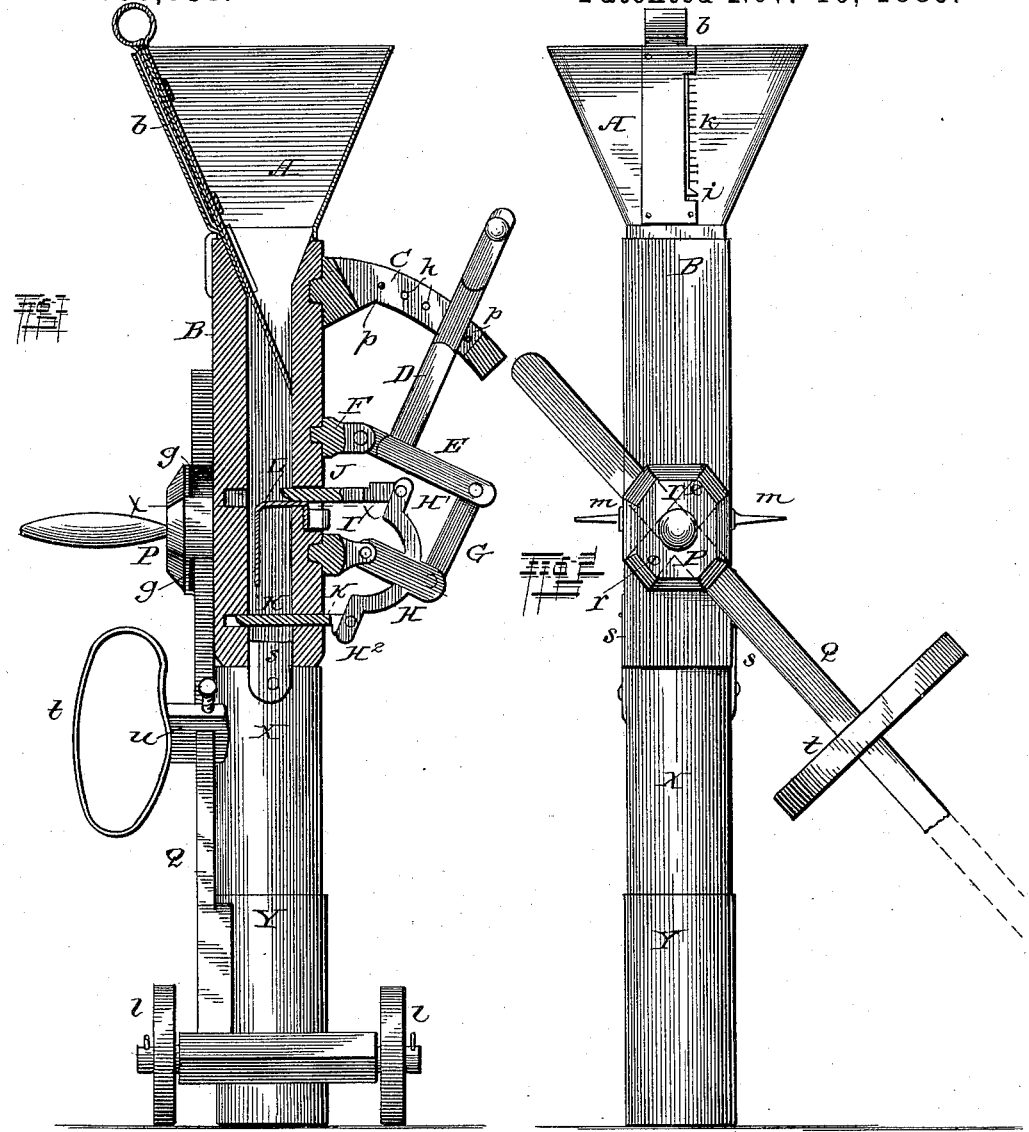
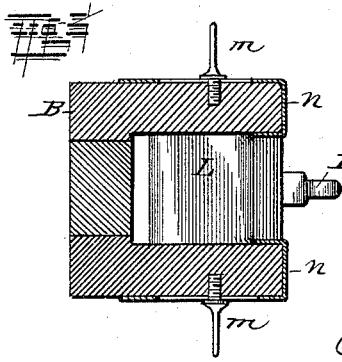
WITNESSES:
Fred G. Dieterich
Edw. W. Byrn
INVENTOR:
Joseph Kittle
BY Munn & Co
ATTORNEYS.

UNITED STATES PATENT OFFICE.

JOSEPH KITTLE, OF EAST BEND, NORTH CAROLINA.

FERTILIZER-DISTRIBUTER.

SPECIFICATION forming part of Letters Patent No. 330,333, dated November 10, 1885.

Application filed September 8, 1884. Serial No. 142,459. (No model.)

*To all whom it may concern:*

Be it known that I, JOSEPH KITTLE, a citizen of the United States, residing at East Bend, in the county of Yadkin and State of North Carolina, have invented certain new and useful Improvements in Fertilizer-Distributers, of which the following is a description.

Figure 1 is a vertical side elevation, partly in section. Fig. 2 is an elevation at right angles to that given in Fig. 1. Fig. 3 is a transverse section through the line $x\ x$ of Fig. 1.

My invention is in the nature of an improved fertilizer-distributer for dropping by hand a definite amount of fertilizer upon the hills of the growing plant; and it consists in the peculiar construction and arrangement of devices for measuring and dropping the fertilizer, for gaging the amount of feed from the hopper, and for sustaining the device and adapting it to persons of different heights, as hereinafter fully described.

In the drawings, A represents the hopper for the fertilizer, which is mounted upon the top of the throat-section B. From the upper portion of this throat-section there projects a curved and slotted arm, C, in the slot of which plays the upright arm D of the elbow-lever D E. This elbow-lever is provided with a handle at its upper end and is fulcrumed below to an offset, F, from the throat. To the outer end of the lower arm of the elbow-lever is jointed the connecting-rod G, which in turn is jointed to the rocking frame H, below. This frame has an upward projection, H', and a lower projection, H², and about its middle horizontal line is fulcrumed to a projection, I, from the throat B. To the upper end, H', of this rocking frame is jointed the slide J, which moves transversely across the throat through a slot in the side thereof and cuts off the passage of fertilizer in the throat. To the lower end, H², of the rocking frame another slide, K, is jointed, which, like slide J, moves through a slot in the side of the throat, and forms a cut-off slide for the same. Just beneath the upper slide, J, there is a gate, L, which is adjustable across the throat to stop the passage of the fertilizer down the throat or allow it to fall, as the case may require. This gate is provided with slotted metal clasps, *n*, Fig. 3, which extend outside and around the two sides of the throat, and are held by set-screws *m* passing through the slots, with the gate in either an open or closed position, as may be desired.

In operating the portion of my invention as so far described, the handle D is oscillated back and forth in the slot of the arm C, and this motion is communicated by connecting rod G to the rocking frame H, which in turn gives a reverse reciprocation to slides J and K, of which the upper one opens and the lower one closes, allowing a definite amount of fertilizer to fall past the upper one and lodge on the lower one, and then at the next movement the upper slide closes, holding the fertilizer above it from dropping down, while the lower one opens and allows the definite amount of fertilizer held upon it to drop down upon the ground. To gage the quantity of fertilizer, the movements of the lever D, and consequently of the slides J and K, may be varied by pins *p*, passing through holes *h* in the arm C, the pins being so adjusted in the said arms as to give a longer or shorter range of oscillation to the lever D. To the lower end of the throat are detachably connected by straps *s* the sheet-metal pipe-sections X Y, which are constructed of a telescopic character, to increase or lengthen the same to suit the varying heights of different persons. At the top of the hopper is arranged a gage-slide, *b*, which is guided in straps inside the hopper and is arranged to slide down and close the throat or be pulled up to open the same more or less, as may be required. This gage-slide is bent over at the top to form a loop, and has its other end extended down in a casing beside the hopper parallel to the other branch in the hopper, and this outside section is provided with an index-hand, *i*, which travels over the graduated scale *k*.

Q is an inclined steady-bar, which is connected below to a pair of small wheels, *l l*, and passes above through one of the two cross channels or grooves *g* in the socket-plate P, which, by means of screws *r*, is fastened to the throat. This bar serves to steady the device in the hands of the workman, and serves also as a point of attachment for the strap *t*, through which the arm of the operator is placed, while his right hand grasps and operates the handle D. For adapting this strap $t$ to a tall or short man it is connected to a sliding block, $u$, which moves over the bar and is fixed in its relation thereto by a set-screw, $v$.

The object in having the two cross-grooves in the socket P is to allow the bar Q to be placed on either side of the device in inclined position, according as the workman is right-handed or left-handed.

Having thus described my invention, what I claim as new is—

1. The combination, with the fertilizer-distributer, as described, of the adjustable inclined steady-bar Q, with wheels at its lower end, as shown and described.

2. The combination, with the throat B, of the cross-grooved socket P, screw $r$, and inclined steady-bar with wheels at its lower end, substantially as described.

3. The combination, with the fertilizer-distributer, of the inclined steady bar with wheels at its lower end, and an adjustable block and strap arranged to slide on said bar, as and for the purpose described.

4. The combination, with the hopper A, of the parallel double-branched gage-bar having one section inside the hopper and the other outside the hopper, and provided with an index-hand and graduated scale, as shown and described.

5. The stop-gate L, having slotted clamp-arms $n$, extending transversely around the throat and upon opposite sides of the same, and set-screws $m$, in combination with the slotted throat B, as and for the purpose described.

JOSEPH KITTLE.

Witnesses:
R. C. POINDEXTER,
J. M. WHITTINGTON.